(12) United States Patent
Lee et al.

(10) Patent No.: US 10,310,315 B2
(45) Date of Patent: Jun. 4, 2019

(54) DISPLAY DEVICE

(71) Applicant: LG Display Co., Ltd., Seoul (KR)

(72) Inventors: Dong-Seok Lee, Bucheon-si (KR);
Yeong-Eun Son, Paju-si (KR);
Hee-Jong Shin, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/684,794

(22) Filed: Aug. 23, 2017

(65) Prior Publication Data

US 2018/0059460 A1 Mar. 1, 2018

(30) Foreign Application Priority Data

Aug. 31, 2016 (KR) .................. 10-2016-0111361

(51) Int. Cl.
*G02F 1/1333* (2006.01)
*G02F 1/1335* (2006.01)

(52) U.S. Cl.
CPC .... *G02F 1/13336* (2013.01); *G02F 1/133308* (2013.01); *G02F 1/133603* (2013.01); *G02F 1/133606* (2013.01); *G02F 2001/13332* (2013.01); *G02F 2001/133314* (2013.01); *G02F 2001/133317* (2013.01); *G02F 2001/133328* (2013.01); *G02F 2201/46* (2013.01); *G02F 2201/56* (2013.01)

(58) Field of Classification Search
CPC ... G02F 1/133308; G02F 2001/133314; G02F 2001/13332; G02F 2001/133317; G02F 2001/133328; G02F 1/13336; G02F 2201/46; G02F 2201/56
See application file for complete search history.

(56) References Cited

U.S. PATENT DOCUMENTS

| | | | | |
|---|---|---|---|---|
| 7,113,237 B2* | 9/2006 | Nitto | ................. | G02F 1/133308 349/58 |
| 8,310,617 B2* | 11/2012 | Shimizu | ............ | G02F 1/133308 349/58 |
| 9,372,301 B2* | 6/2016 | Hsiao | .................... | G02B 6/0085 |
| 2004/0257435 A1* | 12/2004 | Clinton | ................... | G09F 19/12 348/36 |
| 2008/0219003 A1* | 9/2008 | Park | ................... | G02F 1/133603 362/247 |
| 2009/0147171 A1* | 6/2009 | Yang | ................. | G02F 1/133308 349/58 |
| 2013/0187833 A1* | 7/2013 | Kim | ....................... | G06F 1/1641 345/1.3 |
| 2014/0092338 A1* | 4/2014 | Miyazaki | ............ | G02F 1/13452 349/58 |

(Continued)

*Primary Examiner* — Jia X Pan
(74) *Attorney, Agent, or Firm* — Seed IP Law Group LLP

(57) ABSTRACT

The present disclosure relates to a display device where unit liquid crystal display devices are easily assembled for a volumetric display or a multi display by applying a chamfer structure to a side surface portion of the unit liquid crystal display device. The display device includes a plurality of unit liquid crystal display devices, each having a liquid crystal panel, a backlight unit under the liquid crystal panel, a top frame over the liquid crystal display panel, and a main frame surrounding a side surface of the backlight unit. The liquid crystal panel is one the main frame. Additionally, at least one side surface portion of each of the plurality of unit liquid crystal display devices has a chamfer structure.

15 Claims, 7 Drawing Sheets

(56) References Cited

U.S. PATENT DOCUMENTS

| | | | |
|---|---|---|---|
| 2015/0160405 A1* | 6/2015 | Park | G02F 1/133308 362/606 |
| 2015/0163928 A1* | 6/2015 | Cho | G02F 1/133608 362/97.1 |
| 2015/0268506 A1* | 9/2015 | Hsiao | G02F 1/133308 349/58 |
| 2016/0178955 A1* | 6/2016 | Lin | G02F 1/133308 349/58 |
| 2016/0283183 A1* | 9/2016 | Bang | G06F 3/1446 |

* cited by examiner

DISPLAY DEVICE

CROSS-REFERENCE TO RELATED APPLICATIONS

This application claims the benefit under 35 U.S.C. § 119(a) of Korean Patent Application No. 2016-0111361, filed on Aug. 31, 2016, in the Korean Intellectual Property Office, which is incorporated herein by reference in its entirety.

BACKGROUND

Technical Field

The present disclosure relates to a display device, and more particularly, to a display device for a volumetric display or a multi display where a continuity of a whole image is improved by reducing a bezel corresponding to a connecting portion of unit liquid crystal display devices.

Description of the Related Art

A liquid crystal display (LCD) device has been widely used for a television and a monitor due to its superior moving image display capability and high contrast ratio. The LCD device displays an image using an optical anisotropy and a polarization property of a liquid crystal molecule.

The LCD device includes a liquid crystal panel having two substrates and a liquid crystal layer between the two substrates. The LCD device displays an image using a transmittance difference due to a change in an alignment direction of a liquid crystal molecule by an electric field in the liquid crystal panel.

However, since the liquid crystal panel does not include an emissive element, an additional light source is required for displaying an image due to a transmittance difference. As a result, a backlight unit including a light source may be disposed under a rear surface of the liquid crystal panel.

A fluorescent lamp such as a cold cathode fluorescent lamp (CCFL) and an external electrode fluorescent lamp (EEFL) has been used as the light source of the backlight unit. Recently, the fluorescent lamp has been substituted with a light emitting diode (LED) having an advantage in a power consumption, a weight and a brightness as the LCD device has a thin profile and a light weight.

The backlight unit may be classified into a direct type and an edge type. In the backlight unit of the direct type, a light source is disposed under the liquid crystal panel, and a light emitted from the light source is supplied directly to the liquid crystal panel. In the backlight unit of the edge type, a light guide plate is disposed under the liquid crystal panel and a light source is disposed on a side surface of the light guide plate. A light emitted from the light source is supplied indirectly to the liquid crystal panel using a refraction and a reflection in the light guide plate.

An LCD device having a modified shape has attracted attention, and a volumetric display or a multi display has been researched in a commercial display market. However, forming a volumetric display or a multi display with one LCD device has a technical limitation and a cost restriction.

As a result, a multi display or an LCD device having a three-dimensional shape where a plurality of unit LCD devices are combined to each other horizontally and vertically has been suggest. However, a vacant space is generated between the unit LCD devices due to a connecting angle of the unit LCD device and a thickness of the unit LCD device, and discontinuity of an image of the display device increases.

BRIEF SUMMARY

Embodiments relate to a display device where unit liquid crystal display devices are easily assembled for a volumetric display or a multi display by applying a chamfer structure to a side surface portion of the unit liquid crystal display device.

One or more embodiments relate to a display device where a continuity of a whole image is improved by preventing a vacant space between unit liquid crystal display devices.

Additional features of the disclosure will be set forth in part in the description, which follows and in part will become apparent to those having ordinary skill in the art.

It is to be understood that both the foregoing general description and the following detailed description are explanatory, and are intended to provide further explanation of the embodiments as claimed.

BRIEF DESCRIPTION OF THE SEVERAL VIEWS OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Figure 1:
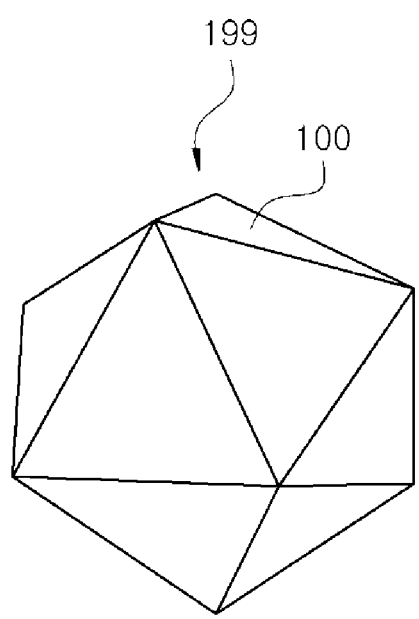
FIG. 1 is perspective view showing a display device according to a first embodiment of the present disclosure.

Reference will now be made in detail to embodiments of the present disclosure, examples of which are illustrated in the accompanying drawings. In the following description, when a detailed description of well-known functions or configurations related to this document is determined to unnecessarily cloud a gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

FIG. 1 is perspective view showing a display device according to a first embodiment of the present disclosure.

In FIG. 1, a display device 199 for a volumetric display according to a first embodiment of the present disclosure includes a plurality of unit liquid crystal display (LCD) devices 100. Each of the plurality of unit LCD devices 100 has a triangular shape, and the volumetric display device 199 including a plurality of surfaces is obtained by combining the adjacent unit LCD devices 100. For example, the display device 199 may be an icosahedral display device having twenty surfaces.

A chamfer structure is applied to each side surface portion of the unit LCD device 100. The chamfer structure may be obtained by cutting an edge portion of an object having an angular cross-section, and the unit LCD device 100 may have the chamfer structure by cutting a side surface portion thereof. Since the chamfer structure is applied to three side surface portions of each unit LCD device 100, the unit LCD devices 100 having the chamfer structure are easily combined with each other. Accordingly, a generation of a vacant space between the combined unit LCD devices 100 is prevented, and a continuity of an image of the display device 199 is improved.

Figure 2:
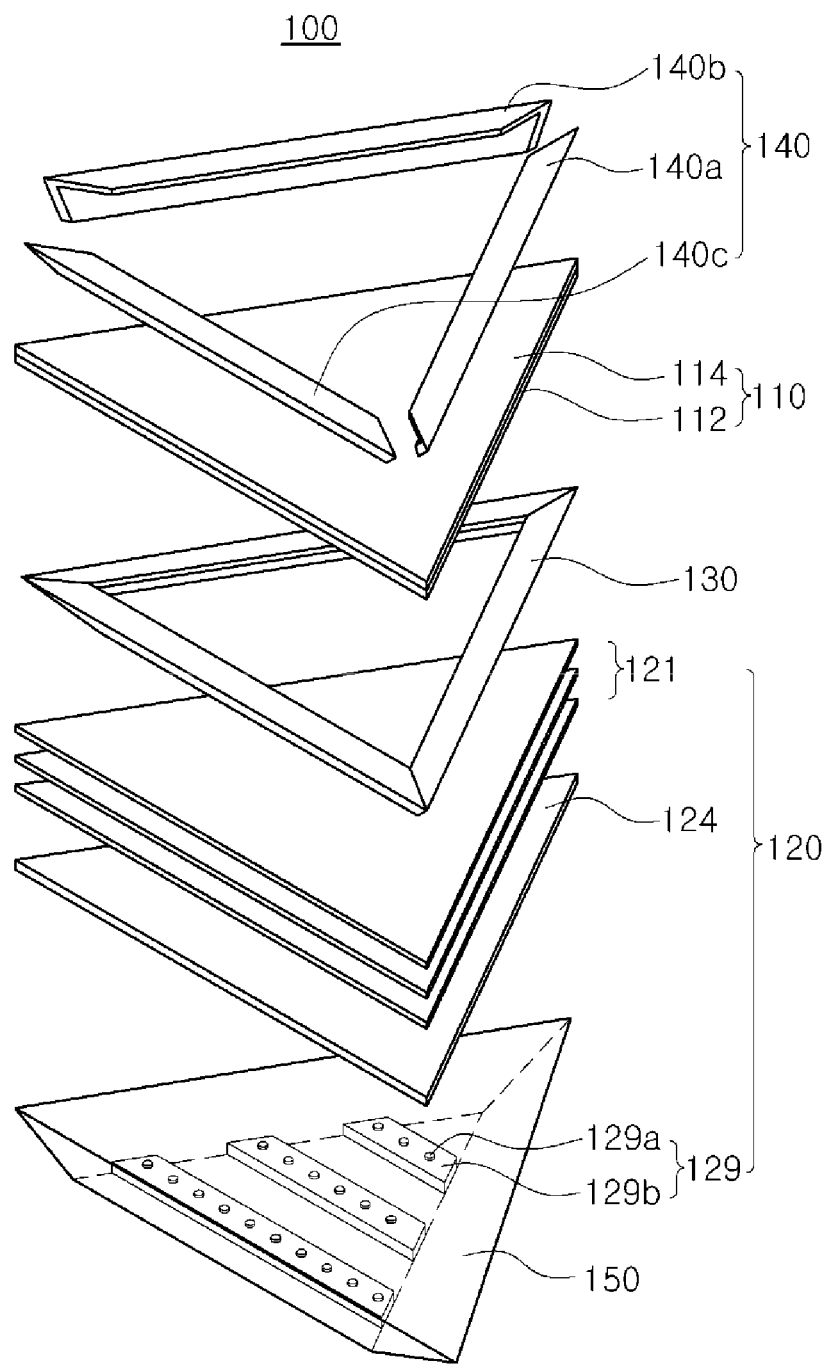
FIG. 2 is an exploded perspective view showing a unit liquid crystal display device of a display device according to a first embodiment of the present disclosure.
Figure 3:
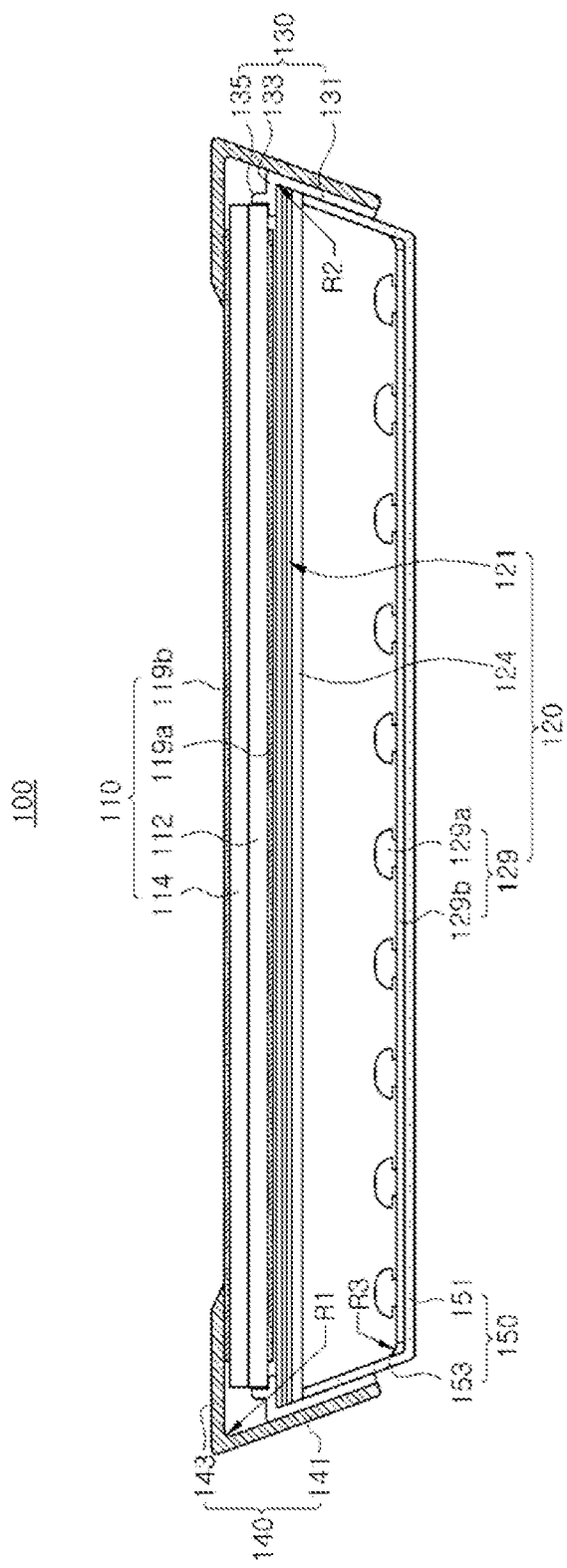
FIG. 3 is a cross-sectional view showing a unit liquid crystal display device of a display device according to a first embodiment of the present disclosure.

FIG. 2 is an exploded perspective view showing a unit liquid crystal display device of a display device according to a first embodiment of the present disclosure, and FIG. 3 is a cross-sectional view showing a unit liquid crystal display device of a display device according to a first embodiment of the present disclosure.

In FIGS. 2 and 3, a unit liquid crystal display (LCD) device 100 of a display device 100 (of FIG. 1) according to a first embodiment of the present disclosure has a triangular shape. The unit LCD device 100 includes a liquid crystal panel 110, a backlight unit 120 and main, top and bottom frames 130, 140 and 150 for modularizing the liquid crystal panel 110 and the backlight unit 120.

The liquid crystal panel 110 displaying an image includes first and second substrates 112 and 114 and a liquid crystal layer (not shown) between the first and second substrates 112 and 114. The first substrate 112 may be referred to as a lower substrate or an array substrate, and the second substrate 114 may be referred to as an upper substrate or a color filter substrate.

Although not shown, a gate line, a data line, a thin film transistor (TFT) and a pixel electrode may be formed on an inner surface of the first substrate 112. The gate line and the data line may cross each other to define a pixel, and the TFT may be disposed in each pixel. In each pixel, the TFT may be connected to the pixel electrode.

In addition, a color filter layer including red, green and blue color filters and a black matrix may be formed on an inner surface of the second substrate 114. Each of the red, green and blue color filters may correspond to the pixel, and the black matrix may surround the pixel to cover the gate line, the data line and the TFT.

A common electrode corresponding to the pixel electrode may be formed on one of the first and second substrates 112 and 114.

First and second polarizing plates 119a and 119b transmitting a selected light may be formed on outer surfaces of the first and second substrates 112 and 114, respectively.

Although not shown, a driving printed circuit board (PCB) may be connected to at least one edge of the liquid crystal panel 110 through a connecting means such as a flexible printed circuit (FPC) or a tape carrier package (TCP). The driving PCB may be bent to contact a side surface of a main frame 130 or a rear surface of a bottom frame 150 through a modularization process.

In the liquid crystal panel 110, when the TFT connected to the corresponding gate line is turned on by a gate signal of a gate driving circuit of the driving PCB, a data signal of a data driving circuit of the driving PCB is transmitted to the pixel electrode through the corresponding data line, and an alignment direction of the liquid crystal molecule is changed by an electric field between the pixel electrode and the common electrode to cause a transmittance difference.

As described herein, a volumetric display is an assembly of multiple displays that encloses a volume. For example, FIG. 1 shows a volumetric display that is an icosahedral volumetric shape having twenty surfaces. The assembly of multiple displays is connected to create a three dimensional object that defines a volume therein.

Each display of the assembly of multiple displays can be separately driven using a driving PCB as described above. The images displayed by the assembly of multiple displays may be combined to create a single view. Each display of the assembly of multiple displays be driven in coordination with each other or driven independently. Accordingly, each display of the assembly of multiple displays may present different images or a coordinated set of images.

A backlight unit 120 supplying a light for displaying an image corresponding to the transmittance difference is disposed under a rear surface of the liquid crystal panel 110.

The backlight unit 120 may include a plurality of light emitting diode (LED) assemblies 129, a diffusing plate 124 over the plurality of LED assemblies 129 and an optical sheet 121 over the diffusing plate 124.

Each of the plurality of LED assemblies 129 may include a plurality of LEDs 129a spaced apart from each other and an LED PCB 129b having the plurality of LEDs 129a thereon.

The plurality of LED assemblies 129 are disposed parallel to a first surface of the bottom frame 150 and are spaced apart from each other along a direction perpendicular to the first surface of the bottom frame 150.

In another embodiment, the plurality of LED assemblies 129 may be disposed perpendicular to a first surface of the bottom frame 150 and may be spaced apart from each other along a direction parallel to the first surface of the bottom frame 150.

The LED PCB 129b having the plurality of LEDs 129a may be a metal core printed circuit board (MCPCB) having a function of heat radiation. A heat of the plurality of LEDs 129a may be emitted by forming a heat radiation plate (not shown) under a rear surface of the MCPCB.

The top frame 140 may include a first slanting portion 141 and a first horizontal portion 143. The first slanting portion 141 may have a first acute angle R1 with respect to the first horizontal portion 143.

The top frame 140 may include a plurality of separated parts instead of one body of a ring shape having an opening.

For example, the top frame 140 may include three separated parts 140a, 140b and 140c, and each separated part 140a, 140b and 140c may include the first slanting portion 141 and the first horizontal portion 143. The first slanting portion 141 may cover an outer surface of a second slanting portion 131 of the main frame 130, and the first horizontal portion 143 may cover an edge of a front surface of the liquid crystal panel 110.

The main frame 130 may support the edge of the liquid crystal panel 110 and may have a triangular ring shape surrounding an edge of the backlight unit 120. The main frame 130 may include the second slanting portion 131, a second horizontal portion 133 and a vertical portion 135. The second slanting portion 131 may wrap a side surface of the backlight unit 120. The second horizontal portion 133 may divide positions of the liquid crystal panel 110 and the backlight unit 120 inside the second slanting portion 131. The vertical portion 135 may protrude perpendicularly from the second horizontal portion 133 and may wrap a side surface of the liquid crystal panel 110. The second slanting portion 131 may have a second acute angle R2 with respect to the second horizontal portion 133.

The side surface of the liquid crystal panel 110 may be guided by the vertical portion 135. The liquid crystal panel 110 may be attached to and fixed to the second horizontal portion 133 using an adhesive pad (not shown) such as a double-sided tape.

When the top frame 140 has one body of a ring shape having an opening, the top frame 140 and the main frame 130 having the first and second acute angles R1 and R2, respectively, may not be easily assembled. As a result, the top frame 140 may include the three separated parts 140a, 140b and 140c, and the three separated parts 140a, 140b and 140c may be individually assembled to the main frame 130.

The top frame 140 and the main frame 130 combined to each other may be disposed on the bottom frame 150. The bottom frame 150 may include a horizontal surface 151 and a slanting surface 153 having an obtuse angle R3 with respect to the horizontal surface 151 at an edge of the horizontal surface 151.

As a result, the main frame 130 may surround the edge of the liquid crystal panel 110 and the backlight unit 120, and the top frame 140 including the three separated parts 140a, 140b and 140c surrounding the edge of the top surface of the liquid crystal panel 110 and the bottom frame 150 covering the rear surface of the backlight unit 120 may be combined with the main frame 130, thereby the liquid crystal panel 110 and the backlight unit 120 modularized by the main frame 130, the top frame 140 and the bottom frame 150.

Since the side surface portions of the unit LCD device 100 are formed by the main frame 130 including the second horizontal portion 133 and the second slanting portion 131 having the second acute angle R2 with respect to the second horizontal portion 133, the bottom frame 150 including the horizontal surface 151 and the slanting surface 153 having the obtuse angle R3 with respect to the horizontal surface 151, and the top frame 140 including the first horizontal portion 143 and the first slanting portion 141 having the first acute angle R1 with respect to the first horizontal portion 143, the three side surface portions of the unit LCD device 100 of a triangular shape has a chamfer structure.

The top frame 140 may be referred to as a case top, a top case or a top cover, the main frame 130 may be referred to as a guide panel, a support main, a main support or a mold frame, and the bottom frame 150 may be referred to as a cover bottom, a bottom cover or a lower cover.

Although the unit LCD device 100 of the display device 199 has an equilateral triangular shape in FIGS. 1 and 2, the unit LCD device 100 may have various triangular shapes in another embodiment.

Figure 4:
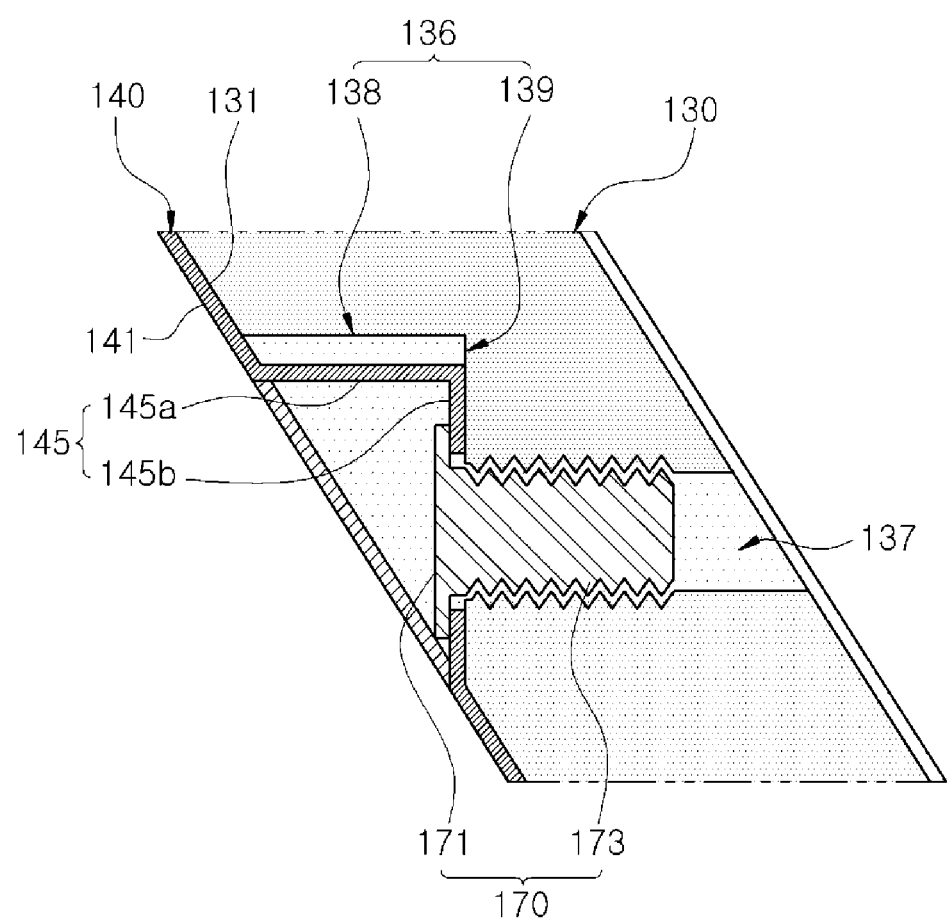
FIG. 4 is a cross-sectional view showing a combination structure of a top frame and a main frame of a unit liquid crystal display device of a display device according to a first embodiment of the present disclosure.

FIG. 4 is a cross-sectional view showing a combination structure of a top frame and a main frame of a unit liquid crystal display device of a display device according to a first embodiment of the present disclosure.

In FIG. 4, a first slanting portion 141 of a top frame 140 wraps an outer surface of a second slanting portion 131 of a main frame 130, and the first slanting portion 141 and the second slanting portion 131 are fixed to each other using a screw 170.

The screw 170 includes a screw head 171 and a screw body 173 having a rod shape and protruding from a bottom surface of the screw head 171. A groove having a slotted shape or a cross shape for combination or separation using a screw driver is formed on a top surface of the screw head 171, and at least one thread of a spiral shape is formed on an outer surface of the screw body 173.

A screw head accommodating portion 136 and a screw hole 137 for combination using the screw 170 are formed on the second slanting portion 131 of the main frame 130.

The screw body 173 is inserted into the screw hole 137 for combination using the screw 170, and a length of the screw hole 137 may be equal to or greater than a length of the screw body 173.

The screw head 171 is buried in the screw head accommodating portion 136. The screw head accommodating portion 136 is a groove having an "L" shape and includes a first surface 138 parallel to the second horizontal portion 133 (of FIG. 3) and a second surface 139 perpendicular to the first surface 138. The screw hole 137 is formed on the second surface 139.

The first slanting portion 141 of the top frame 140 includes a combining portion 145. The combining portion 145 has an "L" shape and includes a first fixing portion 145a under and parallel to the first surface 138 of the screw head accommodating portion 136 and a second fixing portion 145b contacting the second surface 139.

The first fixing portion 145a of the top frame 140 may contact the first surface 138 of the screw head accommodating portion 136 in another embodiment.

The second fixing portion 145b has a hole having a size greater than a size of the screw hole 137 of the second surface 139 and smaller than a size of the screw head 171. As a result, the second fixing portion 145b is combined to the second surface 139 through the screw head 171, and the first slanting portion 141 of the top frame 140 is fixed to an outer surface of the second slanting portion 131 of the main frame 130.

The screw head accommodating portion 136 is formed on the second slanting portion 131 of the main frame 130, and the first slanting portion 141 and of the top frame 140 and the second slanting portion 131 of the main frame 130 are combined to each other in the screw head accommodating portion 136 using the screw 170 without protrusion. Accordingly, increase of a bezel is prevented.

Although the screw hole 137 and the screw head accommodating portion 136 exemplarily have the shapes of FIG. 4, the shapes are not limited to those set forth herein. As a result, various structures where the screw head 171 is buried may be applied to the display device, and various angles where the screw 170 is combined to the screw hole 137 may be applied to the display device.

Figure 5:
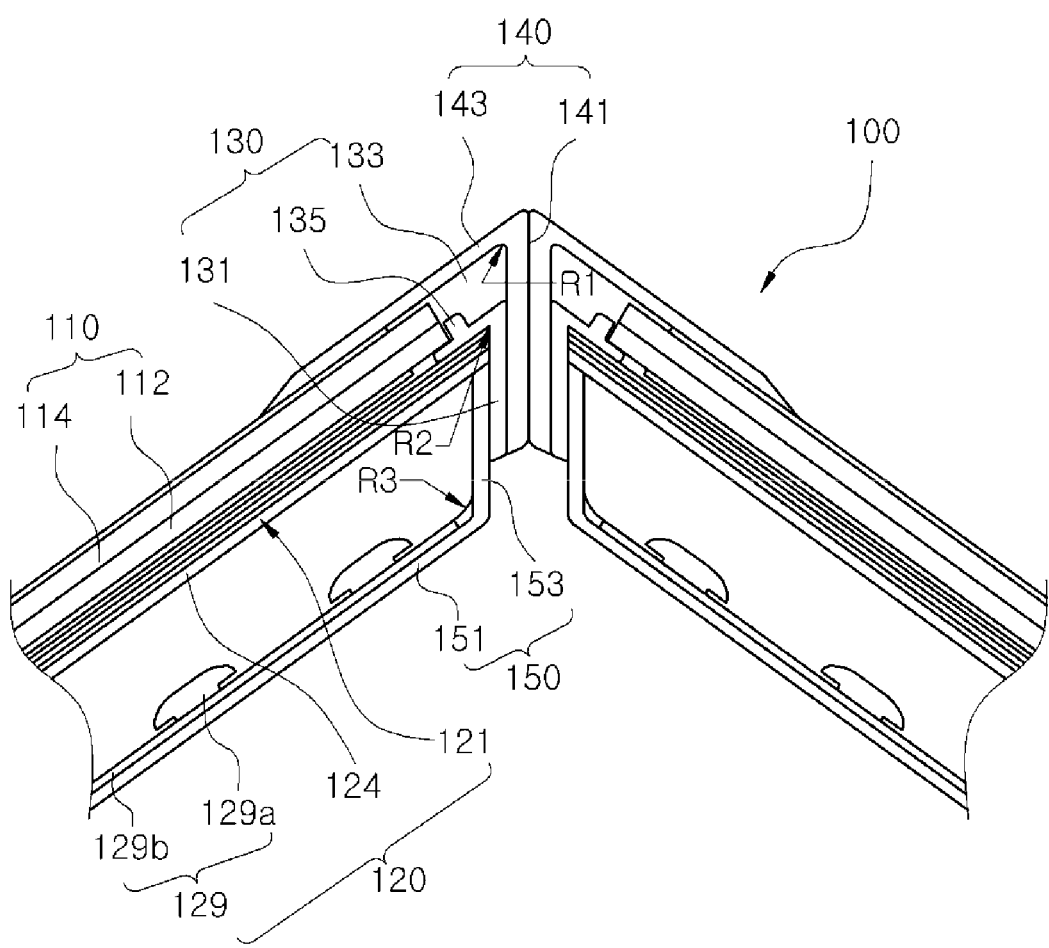
FIG. 5 is a cross-sectional view showing a combination of two unit liquid crystal display devices a display device according to a first embodiment of the present disclosure.

FIG. 5 is a cross-sectional view showing a combination of two unit liquid crystal display devices a display device according to a first embodiment of the present disclosure.

In FIG. 5, a display device 199 (of FIG. 1) includes a plurality of unit liquid crystal display (LCD) devices 100 each having a triangular shape. Since a side surface portion of each of the plurality of unit LCD devices 100 has a chamfer structure, the plurality of unit LCD devices 100 are easily combined to each other. In addition, since a vacant space is not generated between the two adjacent unit LCD devices 100, a continuity of an image is improved.

In the display device according to the related art, since the plurality of unit LCD devices are combined to each other with a combining angle for a three-dimensional shape, the plurality of unit LCD devices are not easily combined to each other due to the combining angle. In addition, since a vacant space is generated due to the combining angle and a thickness of the unit LCD device, a bezel increases.

However, in the display device 199 according to the first embodiment of the present disclosure, the main frame 130 including the second horizontal portion 133 and the second slanting portion 131 having the second acute angle R2 with respect to the second horizontal portion 133, the bottom frame 150 including the horizontal surface 151 and the slanting surface 153 having the obtuse angle R3 with respect to the horizontal surface 151 and the top frame 140 including the first horizontal portion 143 and the first slanting portion 141 having the first acute angle R1 with respect to the first horizontal portion 143 constitute the side surface portion of the unit LCD device 100. In addition, the liquid crystal panel 110 and the backlight unit 120 are modularized with the main frame 130, the top frame 140 and the bottom frame 150 such that the main frame 130 surrounds the edge of the liquid crystal panel and the backlight unit 120, the top frame includes the plurality of separated parts 140a, 140b and 140c (of FIG. 2) surrounding the edge of the front surface of the liquid crystal panel 110, and the bottom frame 150 covers the rear surface of the backlight unit 120. As a result, since the side surface portion of the unit LCD device 100 has a chamfer structure, the plurality of unit LCD devices 100 are easily combined to each other. Further, since the vacant space is prevented from being generated between the two adjacent unit LCD devices 100, a continuity of an image of the display device 199 is improved.

Figure 6A:
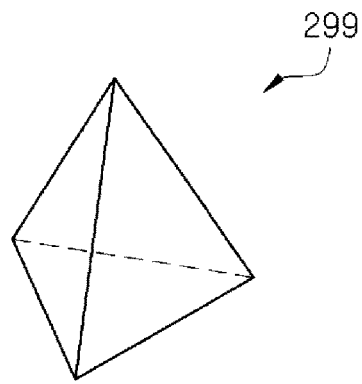
FIG. 6A is a perspective view showing a display device according to a second embodiment of the present disclosure.
Figure 6B:
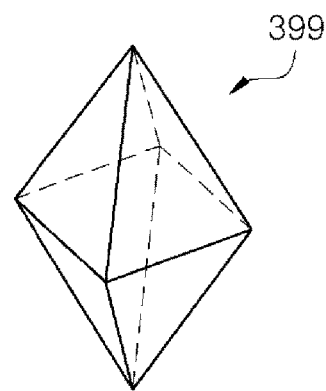
FIG. 6B is a perspective view showing a display device according to a third embodiment of the present disclosure.

FIG. 6A is a perspective view showing a display device according to a second embodiment of the present disclosure, and FIG. 6B is a perspective view showing a display device according to a third embodiment of the present disclosure.

In FIGS. 6A and 6B, a tetrahedral display device 299 having four surfaces for a volumetric display and an octahedral display device 399 having eight surfaces for a volumetric display may be formed by combining a plurality of unit liquid crystal display (LCD) devices 100 (of FIG. 2) each having a triangular shape.

Since a side surface portion of the unit LCD device 100 has a chamfer structure, the plurality of unit LCD devices 100 are easily combined to each other. Further, since a vacant space is prevented from being generated between the two adjacent unit LCD devices 100, a continuity of an image of the tetrahedral display device 299 or the octahedral display device 399 is improved.

Figure 7A:
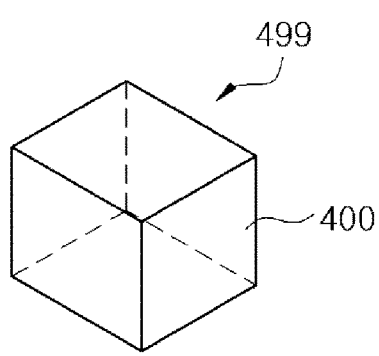
FIGS. 7A and 7B are perspective views showing a display device and a unit liquid crystal display device, respectively, according to a fourth embodiment of the present disclosure.
Figure 7B:
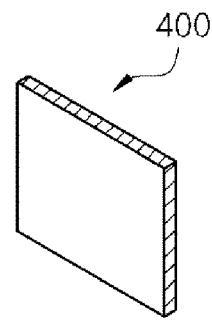

FIGS. 7A and 7B are perspective views showing a display device and a unit liquid crystal display device, respectively, according to a fourth embodiment of the present disclosure. An illustration of the same part as the first embodiment will be omitted.

In FIGS. 7A and 7B, a hexahedral display device 499 for a volumetric display according to a fourth embodiment of the present disclosure includes a plurality of unit liquid crystal display (LCD) device 400, and each of the plurality of unit LCD devices 400 has a rectangular shape.

Even in a display device having a plurality of unit LCD devices of a rectangular shape, a continuity of an image of the display device may increase due to a combining angle and a thickness of the unit LCD device. In the display device 499, since each of four side surface portions of each of the plurality of unit LCD devices 400 has a chamfer structure, the plurality of unit LCD devices 400 are easily combined to each other. In addition, since a vacant space is not generated between the two adjacent unit LCD devices 400, a continuity of an image of the display device 499 is improved.

The unit LCD device 400 having a rectangular shape of the fourth embodiment has substantially the same structure as the unit LCD device 100 having a triangular shape of the first embodiment except for a plane shape.

Similarly to the first embodiment, a top frame 140 (of FIG. 3) of the unit LCD device 400 includes a first horizontal portion 143 (of FIG. 3) and a first slanting portion 141 (of FIG. 3), and the first slanting portion 141 has a first acute angle R1 (of FIG. 3) with respect to the first horizontal portion 143.

The top frame 140 includes a plurality of separated parts instead of one body of a ring shape having an opening. For example, the top frame 140 of the second embodiment may include four separated parts and each separated part may include the first slanting portion 141 (of FIG. 3) and the first horizontal portion 143 (of FIG. 3). The first slanting portion 141 may cover an outer surface of a second slanting portion 131 (of FIG. 3) of the main frame 130 (of FIG. 3), and the first horizontal portion 143 may cover an edge of a front surface of the liquid crystal panel 110 (of FIG. 3).

The main frame 130 may support the edge of the liquid crystal panel 110 and may have a rectangular ring shape surrounding an edge of the backlight unit 120 (of FIG. 3). The main frame 130 may include the second slanting portion 131, a second horizontal portion 133 (of FIG. 3) and a vertical portion 135 (of FIG. 3). The second slanting portion 131 may wrap a side surface of the backlight unit 120. The second horizontal portion 133 may divide positions of the liquid crystal panel 110 and the backlight unit 120 inside the second slanting portion 131. The vertical portion 135 may protrude perpendicularly from the second horizontal portion 133 and may wrap a side surface of the liquid crystal panel 110. The second slanting portion 131 may have a second acute angle R2 with respect to the second horizontal portion 133.

When the top frame 140 has one body of a ring shape having an opening, the top frame 140 and the main frame 130 having the first and second acute angles R1 and R2, respectively, may not be easily assembled. As a result, the top frame 140 may include the four separated parts, and the four separated parts may be individually assembled to the main frame 130.

The top frame 140 and the main frame 130 combined to each other may be disposed on the bottom frame 150. The bottom frame 150 may include a horizontal surface 151 (of FIG. 3) and a slanting surface 153 (of FIG. 3) having an obtuse angle R3 with respect to the horizontal surface 151 at an edge of the horizontal surface 151.

For example, the first acute angle R1, the second acute angle R2 and the obtuse angle R3 may be changed according to a combining angle of the unit LCD devices 400.

The main frame 130 may surround the edge of the liquid crystal panel 110 and the backlight unit 120, and the top frame 140 including the four separated parts surrounding the edge of the top surface of the liquid crystal panel 110 and the bottom frame 150 covering the rear surface of the backlight unit 120 may be combined with the main frame 130. As a result, the liquid crystal panel 110 and the backlight unit 120 are modularized by the main frame 130, the top frame 140 and the bottom frame 150, and the four side surface portions of the unit LCD device 400 having a rectangular shape has a chamfer structure.

Since the side surface portions of the unit LCD device 400 are formed by the main frame 130 including the second horizontal portion 133 and the second slanting portion 131 having the second acute angle R2 with respect to the second horizontal portion 133, the bottom frame 150 including the horizontal surface 151 and the slanting surface 153 having the obtuse angle R3 with respect to the horizontal surface 151, and the top frame 140 including the first horizontal portion 143 and the first slanting portion 141 having the first acute angle R1 with respect to the first horizontal portion 143, the four side surface portions of the unit LCD device 400 of a rectangular shape has a chamfer structure.

Since each of the four side surface portions of the unit LCD device 400 has a chamfer structure, the plurality of unit LCD devices 400 are easily combined to each other. Further, since a vacant space is prevented from being generated between the two adjacent unit LCD devices 400, a continuity of an image of the hexahedral display device 499 is improved.

Figure 8A:
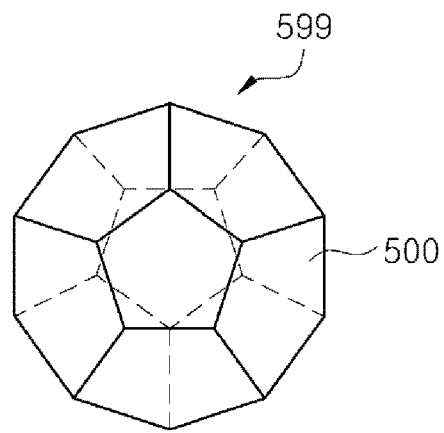
FIGS. 8A and 8B are perspective views showing a display device and a unit liquid crystal display device, respectively, according to a fifth embodiment of the present disclosure.
Figure 8B:
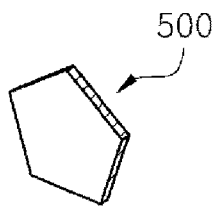

FIGS. 8A and 8B are perspective views showing a display device and a unit liquid crystal display device, respectively, according to a fifth embodiment of the present disclosure. An illustration of the same part as the first embodiment will be omitted.

In FIGS. 8A and 8B, a dodecahedral display device 599 for a volumetric display according to a fifth embodiment of the present disclosure includes a plurality of unit liquid crystal display (LCD) devices 500, and each of the plurality of unit LCD devices 500 has a pentagonal shape.

Even in a display device having a plurality of unit LCD devices of a pentagonal shape, a continuity of an image of the display device may increase due to a combining angle and a thickness of the unit LCD device. In the display device 599, since each of five side surface portions of each of the plurality of unit LCD devices 500 has a chamfer structure, the plurality of unit LCD devices 500 are easily combined to each other. In addition, since a vacant space is not generated between the two adjacent unit LCD devices 500, a continuity of an image of the display device 599 is improved.

The unit LCD device 500 having a pentagonal shape of the fifth embodiment has substantially the same structure as the unit LCD device 100 having a triangular shape of the first embodiment except for a plane shape.

Similarly to the first embodiment, a top frame 140 (of FIG. 3) of the unit LCD device 500 includes a first horizontal portion 143 (of FIG. 3) and a first slanting portion 141 (of FIG. 3), and the first slanting portion 141 has a first acute angle R1 (of FIG. 3) with respect to the first horizontal portion 143.

The top frame 140 includes a plurality of separated parts instead of one body of a ring shape having an opening. For example, the top frame 140 of the second embodiment may include five separated parts and each separated part may include the first slanting portion 141 (of FIG. 3) and the first horizontal portion 143 (of FIG. 3). The first slanting portion 141 may cover an outer surface of a second slanting portion 131 (of FIG. 3) of the main frame 130 (of FIG. 3), and the first horizontal portion 143 may cover an edge of a front surface of the liquid crystal panel 110 (of FIG. 3).

The main frame 130 may support the edge of the liquid crystal panel 110 and may have a pentagonal ring shape surrounding an edge of the backlight unit 120 (of FIG. 3). The main frame 130 may include the second slanting portion 131, a second horizontal portion 133 (of FIG. 3) and a vertical portion 135 (of FIG. 3). The second slanting portion 131 may wrap a side surface of the backlight unit 120. The second horizontal portion 133 may divide positions of the liquid crystal panel 110 and the backlight unit 120 inside the second slanting portion 131. The vertical portion 135 may protrude perpendicularly from the second horizontal portion 133 and may wrap a side surface of the liquid crystal panel 110. The second slanting portion 131 may have a second acute angle R2 with respect to the second horizontal portion 133.

When the top frame 140 has one body of a ring shape having an opening, the top frame 140 and the main frame 130 having the first and second acute angles R1 and R2, respectively, may not be easily assembled. As a result, the top frame 140 may include the five separated parts, and the five separated parts may be individually assembled to the main frame 130.

The top frame 140 and the main frame 130 combined to each other may be disposed on the bottom frame 150. The bottom frame 150 may include a horizontal surface 151 (of FIG. 3) and a slanting surface 153 (of FIG. 3) having an obtuse angle R3 with respect to the horizontal surface 151 at an edge of the horizontal surface 151.

For example, the first acute angle R1, the second acute angle R2 and the obtuse angle R3 may be changed according to a combining angle of the unit LCD devices 500.

The main frame 130 may surround the edge of the liquid crystal panel 110 and the backlight unit 120, and the top frame 140 including the five separated parts surrounding the edge of the top surface of the liquid crystal panel 110 and the bottom frame 150 covering the rear surface of the backlight unit 120 may be combined with the main frame 130. As a result, the liquid crystal panel 110 and the backlight unit 120 are modularized by the main frame 130, the top frame 140 and the bottom frame 150, and the five side surface portions of the unit LCD device 500 having a pentagonal shape has a chamfer structure.

Since the side surface portions of the unit LCD device 500 are formed by the main frame 130 including the second horizontal portion 133 and the second slanting portion 131 having the second acute angle R2 with respect to the second horizontal portion 133, the bottom frame 150 including the horizontal surface 151 and the slanting surface 153 having the obtuse angle R3 with respect to the horizontal surface 151, and the top frame 140 including the first horizontal portion 143 and the first slanting portion 141 having the first acute angle R1 with respect to the first horizontal portion 143, the five side surface portions of the unit LCD device 500 of a pentagonal shape has a chamfer structure.

Since each of the five side surface portions of the unit LCD device 500 has a chamfer structure, the plurality of unit LCD devices 500 are easily combined to each other. Further, since a vacant space is prevented from being generated between the two adjacent unit LCD devices 500, a continuity of an image of the dodecahedral display device 599 is improved.

Figure 9:
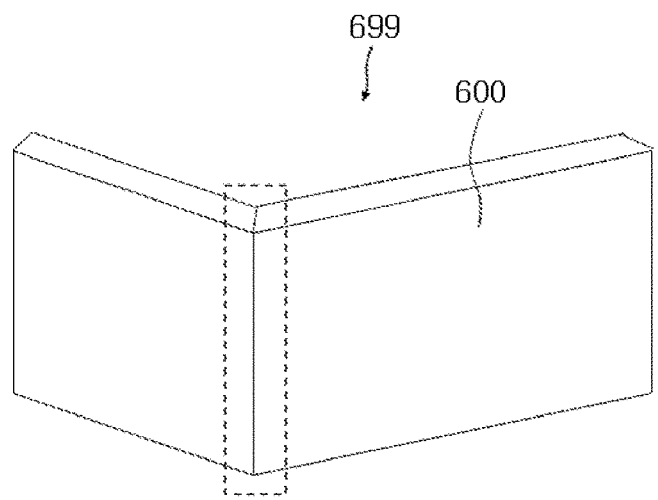
FIG. 9 is a perspective view showing a display device according to a sixth embodiment of the present disclosure.

FIG. 9 is a perspective view showing a display device according to a sixth embodiment of the present disclosure. An illustration of the same part as the first embodiment will be omitted.

In FIG. 9, a display device 699 for a foldable multi display according to a sixth embodiment of the present disclosure includes a plurality of unit liquid crystal display (LCD) devices 600, and each of the plurality of LCD devices 600 has a chamfer structure.

In the display device 699 of the fourth embodiment, the unit LCD device 600 has a rectangular shape, and the plurality of unit LCD devices 600 are combined to each other with a combining angle for a multi display.

Since each of a plurality of side surface portions of the unit LCD device 600 has a chamfer structure, the plurality of unit LCD devices 600 are easily combined to each other. Further, since a vacant space is prevented from being generated between the two adjacent unit LCD devices 600, a continuity of an image of the display device 699 for a multi display is improved.

Although the two unit LCD devices 600 are combined to each other in the sixth embodiment, at least two unit LCD devices each having a polygonal shape and a chamfer structure may be combined to each other to constitute various display devices of a multi display in another embodiment.

Although the tetrahedral display device 299, the hexahedral display device 499, the octahedral display device 399, the dodecahedral display device 599 and the icosahedral display device 199 are exemplarily illustrated in the first to sixth embodiments, the shape of the display device is not limited to those set forth.

In addition, although the plurality of unit LCD devices of the display device has the same shape as each other in the first to sixth embodiments, the plurality of unit LCD devices of the display device may have different shapes in another embodiment. For example, one rectangular unit LCD device 400 and four triangular unit LCD devices 100 may be combined to each other to constitute a pentagonal display device.

Consequently, in the display device according to the present disclosure, since the side surface portion of each of the plurality of unit LCD devices has a chamfer structure, the plurality of unit LCD devices are easily combined to each other. In addition, since generation of a vacant space between the adjacent LCD devices is prevented, a continuity of an image of the display device of a volumetric display or a multi display is improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
a plurality of unit liquid crystal display devices,
wherein each of the plurality of unit liquid crystal display devices comprises:
a liquid crystal panel;
a backlight unit under the liquid crystal panel;
a top frame over the liquid crystal display panel, the top frame including a first slanting portion covering a side surface of the liquid crystal panel and a first horizontal portion covering an edge of a front surface of the liquid crystal panel, the first slanting portion having a first acute angle with respect to the first horizontal portion, the first slanting portion having a combining portion; and
a main frame wrapping around a side surface of the backlight unit and having the liquid crystal panel thereon, the main frame including a second slanting portion wrapping around the side surface of the backlight unit and a second horizontal portion supporting the liquid crystal panel, the second slanting portion having a second acute angle with respect to the second horizontal portion, the second slanting portion including a fastener member accommodating portion,
wherein at least one side surface portion of each of the plurality of unit liquid crystal display devices have a chamfer structure,
wherein the combining portion is disposed in the fastener member accommodating portion,
wherein the first and second slanting portions are connected to each other in the fastener member accommodating portion using a fastener member,
wherein the fastener member accommodating portion is a screw head accommodating portion, and
wherein the fastener member is a screw having a screw head.

2. The display device of claim 1, wherein the screw head accommodating portion includes a first surface parallel to the second horizontal portion and a second surface perpendicular to the first surface, and
wherein the combining portion includes a first fixing portion parallel to the first surface and a second fixing portion contacting the second surface.

3. The display device of claim 1, wherein the top frame includes a plurality of separated parts, and
wherein the plurality of separated parts are individually assembled to the main frame.

4. The display device of claim 1, wherein the main frame further includes a vertical portion protruding from the second horizontal portion, and
wherein the vertical portion wraps the side surface of the liquid crystal panel.

5. The display device of claim 1, further comprising a bottom frame under the backlight unit,
wherein the bottom frame includes a horizontal surface and a slanting surface connected to an edge of the horizontal surface to have an obtuse angle with respect to the horizontal surface.

6. The display device of claim 1, wherein each of the plurality of unit liquid crystal display devices has a polygonal shape.

7. The display device of claim 1, wherein the display device includes one of a volumetric display and a multi display.

8. The display device of claim 7, wherein the volumetric display includes one of a tetrahedral display device, a hexahedral display device, an octahedral display device, a dodecahedral display device and an icosahedral display device.

9. The display device of claim 8, wherein each of the plurality of unit liquid crystal display devices of the tetrahedral display device has a triangular shape.

10. The display device of claim 8, wherein each of the plurality of unit liquid crystal display devices of the hexahedral display device has a rectangular shape.

11. The display device of claim 8, wherein each of the plurality of unit liquid crystal display devices of the octahedral display device has a triangular shape.

12. The display device of claim 8, wherein each of the plurality of unit liquid crystal display devices of the dodecahedral display device has a pentagonal shape.

13. The display device of claim 8, wherein each of the plurality of unit liquid crystal display devices of the icosahedral display device has a triangular shape.

14. The display device of claim 7, wherein the multi display includes a foldable multi display including at least two unit liquid crystal display devices.

15. A display device comprising:
a plurality of unit liquid crystal display devices,
wherein each of the plurality of unit liquid crystal display devices comprises:
a liquid crystal panel;
a backlight unit under the liquid crystal panel;
a top frame over the liquid crystal display panel, the top frame includes a plurality of separated portions, each separated portion including a first slanting portion covering a side surface of the liquid crystal panel and a first horizontal portion covering an edge of a front surface of the liquid crystal panel, the first slanting portions having an acute angle with respect to the first horizontal portions; and
a main frame on a side surface of the backlight unit and having the liquid crystal panel thereon, the main frame includes a second slanting portion on the side surface of the backlight unit and a second horizontal portion supporting the liquid crystal panel, the second slanting portion has a second acute angle with respect to the second horizontal portion,
wherein at least one side surface portion of each of the plurality of unit liquid crystal display devices have a chamfer structure,
wherein each of the first slanting portions includes a combining portion,
wherein the second slanting portion includes fastener member accommodating portions,
wherein the combining portions are disposed in the fastener member accommodating portions,
wherein the first and second slanting portions are combined to each other in the fastener member accommodating portions using fastener members,
wherein the fastener member accommodating portions are screw head accommodating portions, and
wherein the fastener members are screws having a screw head.

* * * * *